(12) United States Patent
Verhaeghe et al.

(10) Patent No.: US 8,539,878 B2
(45) Date of Patent: Sep. 24, 2013

(54) SQUARE BALER AND A RELATED CONTROL METHOD

(75) Inventors: Didier Verhaeghe, Ieper (BE); Bart M. A. Missotten, Winksele Herent (BE); Jan Van Groenigen, Varsenare (BE); Niklaas G. C. Monteyne, Blankenberge (BE); Olivier A. Vanhercke, Gistel (BE); Pieten W. Viaene, Ichtegem (BE); Tom Coen, Zemst (BE); Robrecht M. K. Dumarey, Gistel (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/576,924

(22) PCT Filed: Feb. 11, 2011

(86) PCT No.: PCT/EP2011/052052
§ 371 (c)(1),
(2), (4) Date: Oct. 22, 2012

(87) PCT Pub. No.: WO2011/098572
PCT Pub. Date: Aug. 18, 2011

(65) Prior Publication Data
US 2013/0042770 A1    Feb. 21, 2013

(30) Foreign Application Priority Data
Feb. 12, 2010   (BE) .............................. BE2010/0081

(51) Int. Cl.
*B30B 15/26*     (2006.01)
*A01F 15/08*     (2006.01)

(52) U.S. Cl.
USPC ............................................... 100/35; 100/48

(58) Field of Classification Search
USPC ............. 100/4, 7, 35, 41, 43, 45, 48, 50, 179, 100/188 R, 191, 192, 242; 56/341
See application file for complete search history.

(56) References Cited

U.S. PATENT DOCUMENTS

| 2,796,825 | A | | 6/1957 | Kriegbaum et al. | |
|---|---|---|---|---|---|
| 4,037,528 | A | | 7/1977 | White et al. | |
| 5,123,338 | A | * | 6/1992 | Mathis | 100/43 |
| 5,384,436 | A | * | 1/1995 | Pritchard | 177/136 |
| 5,811,739 | A | * | 9/1998 | Palmore | 177/136 |
| 5,913,801 | A | * | 6/1999 | Bottinger et al. | 56/10.2 R |
| 6,101,932 | A | * | 8/2000 | Wilkens | 100/41 |
| 6,257,131 | B1 | * | 7/2001 | Wilkens et al. | 100/43 |

FOREIGN PATENT DOCUMENTS

| EP | 0655190 B1 | 7/2000 |
|---|---|---|
| EP | 1935232 A1 | 6/2008 |
| WO | WO2011012488 A1 | 2/2011 |

* cited by examiner

*Primary Examiner* — Jimmy T Nguyen
(74) *Attorney, Agent, or Firm* — Patrick M. Sheldrake

(57) ABSTRACT

A square baler comprising a controller for controlling the operation of the baler in dependence on the first, second and third signals representing the mass of a bale, the force of the piston of the baler, the energization of the actuator respectively and an input target value for the mass of the bale wherein the first signal is fed back in a first control loop and compared with the target weight to generate a target force, the second signal is fed in a second control loop and compared with the target force to generate a target energization, the third signal is fed in a third control loop and compared with the target energization to control the energization of the actuator.

10 Claims, 2 Drawing Sheets

SQUARE BALER AND A RELATED CONTROL METHOD

CROSS-REFERENCE TO RELATED APPLICATIONS

This application is the US National Stage filing of International Application Serial No. PCT/EP2011/052052 filed on Feb. 11, 2011 which claims priority to Belgium Application BE2010/0081 filed Feb. 12, 2010, each of which is incorporated herein by reference in its entirety.

BACKGROUND OF THE INVENTION

1. Field of the Invention

This invention relates to a baler and a related control method.

2. Description of the Related Art

Balers are machines used in agriculture for the purpose of creating bales of (typically) straw or other biomass such as hay or silage produced during a harvesting or mowing operation.

Various designs of baler have been proposed in the prior art. A common characteristic of virtually all balers is that they are towed behind agricultural vehicles such as tractors. A baler includes an infeed via which biomass is ingested into the interior of the baler and compressed or otherwise treated to form bales. The completed bales are tied with twine to make them rigid and self-supporting and are ejected via a discharge chute typically at the rear of the baler machine so as to fall or be placed on the ground behind the tractor/baler combination as its moves forwardly along a harvested field.

In the 1970's and 1980's, so-called "round" balers were developed. These produce large cylindrical bales.

Although many round balers are still sold annually and many more remain in use, in many areas their popularity has been usurped by rectangular or "square" balers.

Such balers produce cuboidal bales that have a number of advantages over "round" bales.

The handling of rectangular bales is more convenient and is safer. Additionally as a result of the cuboidal shapes of rectangular bales it is relatively easy to transport them and stack them for temporary or long term storage in stable structures either in fields or in farmyards. Rectangular bales can be produced with a high density. When used rectangular bales are also easily distributed as they are formed from a number of slices.

Significantly, it is possible to adjust the characteristics of a rectangular bale in some cases while the bale is being formed.

This is important because straw or other baled biomass is an economically valuable crop. Very often the value of baled straw is assessed on the basis of the weight of each bale produced by the operation of the baler. It can be very important to control the density of the baled biomass in order to assure that the bale weights are substantially constant during passage of a baler from part of a field to another. Variations however in the characteristics (especially the moisture) of the straw ingested from place to place into the baler may mean that there is a frequent or even constant need to adjust bale density during baling operations in order to meet the objective of consistent bale mass.

In a rectangular baler it is possible to adjust the bale density because the baler includes an substantially cuboidal bale-forming chamber. It is known in the art to construct the bale-forming chamber with one or more moveable side walls. The positions of the side walls can be adjusted so as to alter the volume of the bale-forming chamber and thereby squeeze the bale to a greater or lesser degree during its formation. If as is commonplace in a baler each charge of biomass ingested is substantially of constant volume, causing a reduction in the volume of bale-forming chamber in this fashion leads to the creation of higher density bales, and vice versa. This in turn provides an ability to control the densities of the formed bales.

In more detail, each charge introduced into the bale-forming chamber is, at the point of introduction, uncompressed or compressed to a relatively low level. It is moved along the bale-forming chamber by longitudinal strokes of a piston that reciprocates under the action of an attached arm that in turn is driven by a bell crank secured to a rotating member. Each stroke of the piston therefore compresses an amount of biomass against the biomass already available in the bale-forming chamber; and in consequence the density of the formed bale increases if the volume into which the biomass is swept is reduced as a result of adjustments of the positions of the sidewalls of the chamber at locations "downstream" of the furthest point reached by the piston during its motion.

The dimensions of square bales however substantially are fixed firstly because of the cross-sectional dimensions of the bale-forming chamber and secondly because the baler forms the biomass into identical bale lengths that are ejected via the discharge as substantially identical, individual bales.

An example of an adjustable bale-forming chamber sidewall is shown in U.S. Pat. No. 4,037,528. This disclosure describes sidewalls that are moveable under the influence of cam-like arms that are caused to rotate by attached hydraulic rams. The arrangement defines a pair of four-bar linkages each including one of the sidewalls. Operation of the associated ram therefore causes the sidewall to move inwardly or outwardly, relative to the interior of the bale-forming chamber, in an even fashion causing uniform alteration of the chamber volume over a portion of its length.

A more modern form of bale density adjustment that is suitable for inclusion in a rectangular baler is disclosed in EP 0 655 190.

The ability to adjust the density of bales is likely to be of most use if the baler includes a feedback control loop for the purpose of assessing whether the actual bale density achieved matches a target density value.

It is known from EP 1 935 232 to provide a weighing device for the purpose of weighing discharged bales. In EP 1 935 232 the bale discharge chute includes a pivotable portion. The purpose of the pivotable portion is to alter the trajectory of a completed bale as it slides along the discharge chute. This in turn provides the advantage of controlling discharge of a completed bale in such a fashion that the bale suffers minimal damage on exit from the baler and lies in a predictable orientation in the field.

The pivoting section of the discharge chute in the device of EP 1 935 232 incorporates one or more sensors for sensing the bale mass and generating a signal that is indicative thereof. EP 1 935 232 however does not disclose use of a bale mass signal in conjunction with adjustable side walls of a bale-forming chamber.

U.S. Pat. No. 2,796,825 discloses a hydraulic control system for a rectangular baler.

In the rectangular baler of U.S. Pat. No. 2,796,825 the output of a weighing platform in the discharge chute is generated as an hydraulic pulse. The pulse is used as an input command to a piston that adjusts the positions of sidewalls in a bale-forming chamber. In the baler of U.S. Pat. No. 2,796,285 therefore bale mass measurements are used to adjust bale density.

A significant drawback of the arrangement disclosed in U.S. Pat. No. 2,796,825, however, is that the weighing platform disclosed therein only generates a signal when a completed bale is stationary on it.

Since it takes at least 30, and up to 120, seconds to form a bale in even a modestly-sized rectangular baler the response frequency of the system disclosed in U.S. Pat. No. 2,796,825 is no better than 0.033 Hz and it typically would be significantly slower than this.

A tractor towing a baler across a harvested field however may attain a speed of perhaps 15 km/h when travelling over windrows. During the time required to form a single bale, therefore, the tractor/baler combination will travel at least 200 metres. The characteristics of eg. cut straw lying in a field on the other hand may vary significantly over a distance of one metre or less. The bale weight signals generated using the apparatus of U.S. Pat. No. 2,796,825, being updated say once every 50 seconds, are relatively unlikely to be capable of taking account of such variations.

Put another way, the control system in U.S. Pat. No. 2,796,825 is able to resolve the bale mass data only to an accuracy of 200 metres of baler travel, which is very unlikely to be sufficiently accurate as to provide acceptable control over bale density adjustments.

There is therefore a significant need for an arrangement that controls bale densities with greater precision than in the prior art.

SUMMARY OF THE INVENTION

According to the invention in a first aspect there is provided a square baler comprising a biomass feed connected to a bale-forming chamber, a piston that is reciprocable in the bale-forming chamber in order to compress biomass fed into the bale-forming chamber via the biomass feed and form bales and a bale discharge, the dimensions of part of the interior of the bale-forming chamber being adjustable under the influence of at least one actuator the energization of which is controlable; the baler comprising:
 a) a first sensor for sensing the mass of a bale formed in the baler and generating a first signal that is indicative thereof;
 b) a second sensor for sensing the force applied by the piston and generating a second signal that is indicative thereof;
 c) a third sensor for sensing the energization of the acuator and generating a third signal that is indicative thereof;
 d) means for setting a target weight value by the operator for determining a target value for the mass of a bale formed in the baler; and
 e) a controller for controlling the operation of the baler in dependence on the first, second and third signals, characterised in that:
  the first signal is fed back in a first control loop and compared with the target weight value in order to generate a target force value;
  the second signal is fed back in a second control loop and compared with the target force value in order to generate a target energization value;
  the third signal is fed back in a third control loop and compared with the target energization value in order to control the energization of the actuator; and
  the sampling frequency of the second control loop is higher than that of the first control loop and lower than that of the third control loop.

An advantage of this arrangement is that the baler produces sidewall arm pressure signals (as represented by the third signals indicating energization of an actuator) at a much higher sampling frequency than is possible in the case of mass signals that can only be generated at most at the completion of each respective bale.

In consequence the sidewall pressure (third sensor) signals may be employed as a high-frequency input to the innermost of three "nested" control loops with the result that the disturbance rejection of the overall control scheme is determined not by the frequency with which bale mass signals can be generated and instead is under the influence of the pressure signals that are relatively high-frequency signals.

The control loops are employed to generate adjustment signals that are based on the sidewall pressure and hence the pressure in a sidewall adjustment hydraulic system as described in more detail below in order to achieve a target bale weight and hence a target bale density. The bale weight measurement signals need to be sampled only at a relatively low frequency since the bale weight signal is relevant only on completion of each bale. Instead any changes in eg. straw mixture leading to unwanted bale density changes are sensed as changes in the force applied by the piston and/or in the hydraulic sidewall pressure. Adjustments to the plunger force target value and the hydraulic sidewall pressure target value may then be made as a result of said sensed pressure and force respectively.

As a result of the foregoing arrangement, the baler of the invention may accurately take account of variations in the characteristics of the straw (or other biomass) as the baler travels over a field. The baler of the invention addresses the problem of a change in the straw characteristic leading to the formation of under-weight or over-weight bales relative to a target bale mass. The baler of the invention therefore provides clear advantages over the prior art devices described above.

Preferably as indicated above the actuator (18) is energizable by pressure in a hydraulic circuit, and the third sensor (52) senses pressure in the hydraulic circuit and generates the third signal (MP) indicative thereof.

This arrangement is advantageous not least because hydraulic control systems provide adequately high forces and sufficient positional accuracy as to be very suitable for modifying the positions of sidewalls of a bale-forming chamber. Furthermore it is well-known in the agricultural machinery art how to configure hydraulic circuits in order to generate accurate pressure measurements.

Preferably the sampling frequency of the third control loop is approximately 5 Hz or higher.

Such a sampling frequency provides a bale density update resolution of approximately one metre when the baler is being towed at 15 km/h. Such a resolution is deemed to be adequate for the requirements of the invention without requiring complex or expensive very high frequency processing circuits.

In a preferred embodiment of the invention the second sensor is or comprises a load cell that detects the force exerted by the piston, the sampling frequency of the second control loop being approximately 0.8 Hz.

A sampling frequency of 0.8 Hz corresponds to the reciprocations of the plunger of the baler. It follows that in accordance with a preferred embodiment of the invention the force exerted by the plunger on the forming bale is measured, and a signal indicative thereof generated, once for each cycle of the plunger.

Since the force exerted by the plunger is exerted at each reciprocation to compress an amount of straw or other biomass against the biomass already available in the bale-forming chamber, the plunger force is indicative of changes in biomass characteristics. There is however no point in sampling the plunger force more than once per resolution, since only on the forward stroke of the plunger is the plunger force proportional to the density of the biomass that is to be formed into the bale.

Conveniently the first sensor is or comprises a load cell disposed to detect the mass of a bale, the sampling frequency of the first control loop being approximately 0.02 Hz or lower.

An square baler in which such an arrangement arises is described in EP 1 935 232 in particular with reference to FIGS. 1 and 2 thereof. However, other means of weighing individual, completed bales are possible within the scope of the invention.

In accordance with the preferred embodiment of the invention the bale discharge comprises a bale chute comprising a pivotable portion on which the mass of a completed bale is supported substantially entirely during discharging, the load cell being disposed to generate a signal that is indicative of the mass of a thus-supported bale acting via the pivotable portion.

Such an arrangement is consistent with the baler described in EP 1 935 232.

Preferably the bale-forming chamber comprises at least one moveable wall portion that is moveable inwardly and/or outwardly to adjust the volume of the interior of the bale-forming chamber, the at least one moveable wall portion and at least one actuator being connected so that the at least one actuator causes movement of at least one moveable wall portion.

In a practical embodiment of the invention the baler the baler comprises two actuators.

Typically the actuators are rams. To this end therefore the at least one actuator (18) is part of or operatively connected to a hydraulic or pneumatic piston.

According to a second aspect of the invention there is provided a method for controlling a square baler comprising a biomass feed connected to a bale-forming chamber, a piston that is reciprocable in the bale-forming chamber in order to compact biomass fed into the bale-forming chamber via the biomass feed and form bales and a bale discharge, the dimensions of part of the interior of the bale-forming chamber being adjustable under the influence of at least one actuator the energization of which is controllable; the baler comprising:
  a) a first sensor for sensing the mass of a bale formed in the baler and generating a first signal that is indicative thereof;
  b) a second sensor for sensing an the force applied by the piston and generating a second signal that is indicative thereof;
  c) a third sensor for sensing the energization of the actuator and generating a third signal that is indicative thereof, and
  d) means for setting a target weight value by the operator for determining a target value for the mass of a bale formed in the baler;
  e) a controller for controlling the operation of the baler in dependence on the first, second and third signals, characterised in that the method comprises the steps of:
    feeding the first signal back in a first control loop and comparing it with the target weight value in order to generate a target weight value;
    feeding the second signal back in a second control loop and comparing it with the target force value in order to generate a target energization value;
    feeding the third signal back in a third control loop and comparing it with the target energization value in order to control the energization of the actuator; and
  the sampling frequency of the second control loop being higher than that of the first control loop and lower than that of the third control loop.

The method according to the second aspect of the invention therefore advantageously is analogous to the apparatus of the first aspect.

BRIEF DESCRIPTION OF THE DRAWINGS

There now follows a description of a preferred embodiment of the invention, by way of non-limiting example, with reference being made to the accompanying drawings in which.

DETAILED DESCRIPTION OF THE INVENTION

Figure 1:
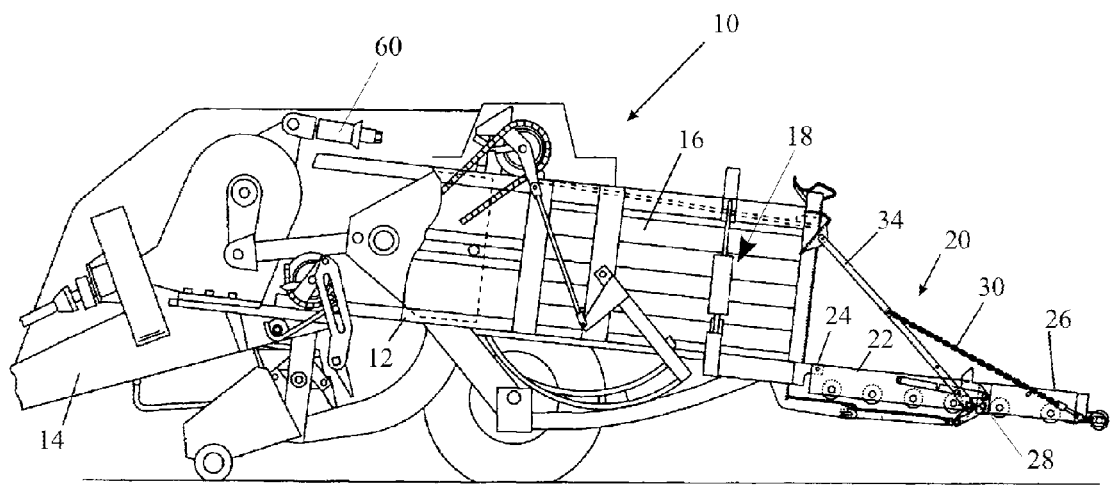
FIG. 1 is a schematic, vertically sectioned view of a typical square baler.
Figure 2:
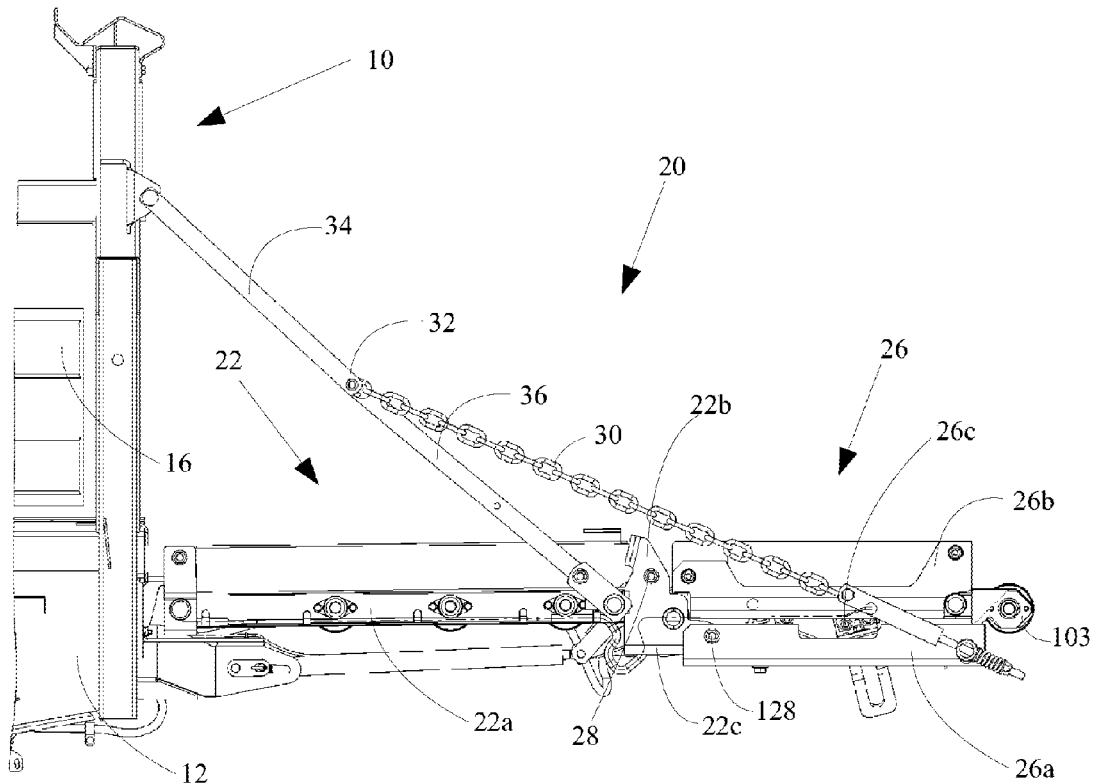
FIG. 2 shows in more detail the bale discharge area of the FIG. 1 baler.

Referring to the drawings, FIGS. 1 and 2 show a prior art agricultural baler 10 comprising a frame 12 which is equipped with a biomass feed in the form of a channel 14 that projects forwardly to be hitched to a towing tractor or other vehicle. Square bales are formed and tied in a bale-forming chamber 16 in a conventional manner and the bales are discharged from the rear end of the baling chamber 16 onto a discharge in the form of a chute, generally designated 20.

The chute 20 is formed in two portions, namely a front portion 22 that is pivoted about an axis 24 located at the rear end of the frame 12, and a rear portion 26 that is pivotable relative to the front portion 22 about an axis 28. In the unloaded position, shown in the figures, the bale-supporting surfaces of both portions 22 and 26 are coplanar and inclined at an angle of approximately 6 deg. to the horizontal. If dropped from a height onto the ground bales can be damaged and the purpose of the pivoting rear portion 26 is to lower the bales more gently onto the ground.

When the weight of a bale rests on the rear portion 26 of the bale chute 20, the latter pivots clockwise, as viewed, to lower its trailing end closer to the ground. In this way the bale slides off the rear portion 26 without any risk of the bale toppling.

The rear portion 26 of the bale chute is supported on each side of the baler by a chain 30 connected to an elbow joint 32 between two arms 34 and 36 that are secured to one another via an articulated joint. In the raised position of the rear portion 26 shown the two arms 34 and 36 are held in a straight line by the weight of the front section 22 of the chute 20 and by any un-discharged bale which is formed in the bale chamber 16.

When the rear portion 26 supports the weight of a bale, it pivots until the chain 30 extends in line with the arm 34.

In one prior art embodiment as described in for example EP 1 935 232 and illustrated in FIG. 1 a transducer such as a load cell is straightforwardly disposed to measure the tension in the chain 30 while the rear portion 26 of the chute 20 is in the pivoted position described (ie. when the mass of a bale is completely supported on portion 26). In this position, the rear end of the bale is raised from the front portion 22 of the chute and substantially all its weight is supported by the rear portion 26. Because the bale is tilted, there is minimal contact between the bale being weighed and the succeeding bale acting to push it off the chute 20. The combination of these factors increases the accuracy of the measured weight signal, and thus the value of the weight of the bale, compared with prior art devices. The chain tension is therefore a reliable indicator of the weight of the bale and there is ample time to take the required measurement because the bale remains supported in the described fashion from the time that its centre of gravity has passed the point where its weight is sufficient to pivot the rear portion into the inclined position, until the instant when the rear end of the bale touches the ground. If several measurements are taken, filtering of electronic signals may be used to minimise errors caused by the chute being jogged up and down as the baler 10 is towed over uneven ground.

According to another prior art embodiment as described in for example EP 1 935 232 and BE2009/0460 and illustrated in FIG. 2, instead of measuring tension in the chain 30, it would be possible to employ at least one load beam 26c in the coupling between the rear and front portions of the chute 20.

The front portion 22 comprises a first portion 22a that is pivotally attached to the baler frame 12 and a second portion that forms a frame made up of vertical plates 22b and a horizontal plate 22c. The second portion 22b, 22c is pivotally attached to the first portion 22a by means of an axis 28 that is only used to move the rear portion of the chute into the transport position as described more in detail in EP1935232. The rear portion 26 comprises a pivot frame 26a, which pivots about an axis 128 situated below the support surface of the front portion 22a and rearwards from the leading edge of the rear portion 26, and a weighing table 26b, which is supported on the pivot frame 26a by means of load beams 26c. The rear portion 26, that is pivotally mounted to the front portion 22 in this way pivots about a horizontal axis 128 between an upper, bale sustaining, position and a lowered, bale discharging position to allow each bale to be lowered onto the ground without the bale toppling onto its end as it leaves the bale chute 20. The position of the pivot axis 128 provides a clear separation of the bale once the weighing table 26b pivots in the bale discharging position, so that the bale may be weighed during this suitable weighing timespan. The weighing table is formed of a roller conveyor.

According to an embodiment of BE2009/0460, one of the rollers, preferably the last roll 30 is provided with a braking device 103 mounted on the roller's axis, and configured to influence the roller's rotational speed by the braking force.

As is described above and known in the prior art and shown in FIG. 1, the baler includes a piston 62 that is reciprocable in the bale-forming chamber 16. Biomass fed via the channel 14 is thereby compacted so as to form bales in the above-described operation of the device 10. A sensor 60 is configured to measure the force exerted by the piston 62 in the bale-forming chamber 16 on each forward stroke of the piston as known from for example EP0655190.

The dimensions of part of the interior of the bale-forming chamber 16 are adjustable.

Figure 3:
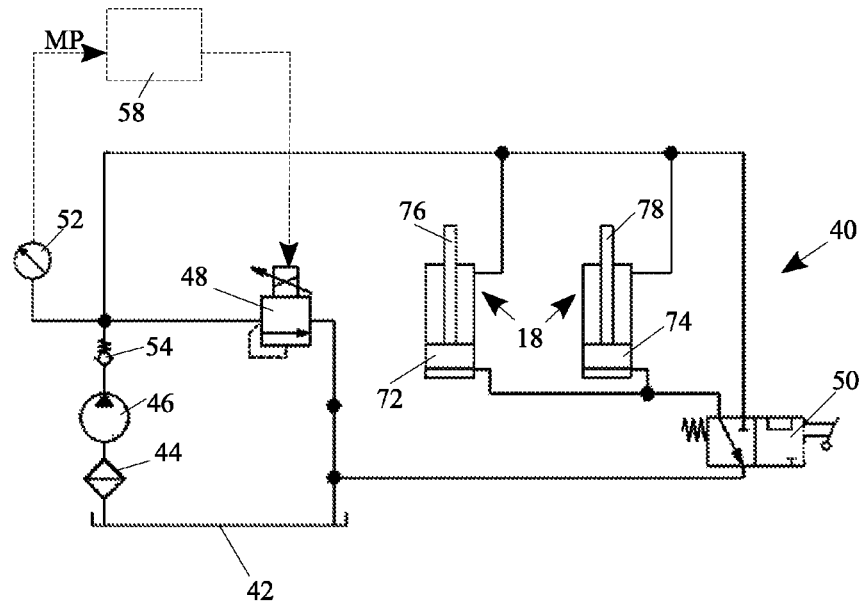
FIG. 3 is a schematic representation of an hydraulic control circuit for a baler such as that shown in FIGS. 1 and 2.

In particular, two opposed sidewall portions of the baleforming chamber 16 are moveable under the influence of (in the embodiment shown) a pair of hydraulic actuators 18 comprising rams 72, 74 that are best shown schematically in FIG. 3.

Each ram 72, 74 includes a respective output shaft 76, 78 that is connected to a sidewall portion that is moveable inwardly and outwardly under the influence of the rams in order to decrease and increase the formation pressure acting on the biomass during bale forming operation. Through this means it is possible to adjust the density of the formed bales, by squeezing the biomass to a chosen degree during bale forming.

The rams 72, 74 are connected in an hydraulic circuit 40 (FIG. 3) comprising an oil tank 42, filter 44, pump 46, proportional solenoid valve 48 and deflecting valve 50 connected as shown. A hydraulic pressure sensing device is shown schematically as a pressure gauge 52 that is visible in FIG. 3, but in practice the sensing device may take a range of possible forms.

It will be apparent that by adjusting the setting of the proportional solenoid valve 48 the pressure in the hydraulic circuit 40 may be set when the deflecting valve 50 is in the position shown in FIG. 3. When for example the hydraulic rams need to be de-activated, for example for performing a bale eject at the end of a job, the deflecting valve 50 may then be operated to its other position in order to de-activate the rams 32, 34 in order to open the moveable sidewalls and relieve the pressure from the bale inside the baleforming chamber.

An optional feature of the FIG. 3 circuit 40 is a one-way valve 54 as shown.

The pressure gauge 52 lies immediately downstream of the one-way valve 54 and is representative of a sensor or other transducer the purpose of which is to generate a signal MP that is indicative of the pressure in the circuit 40.

Figure 4:
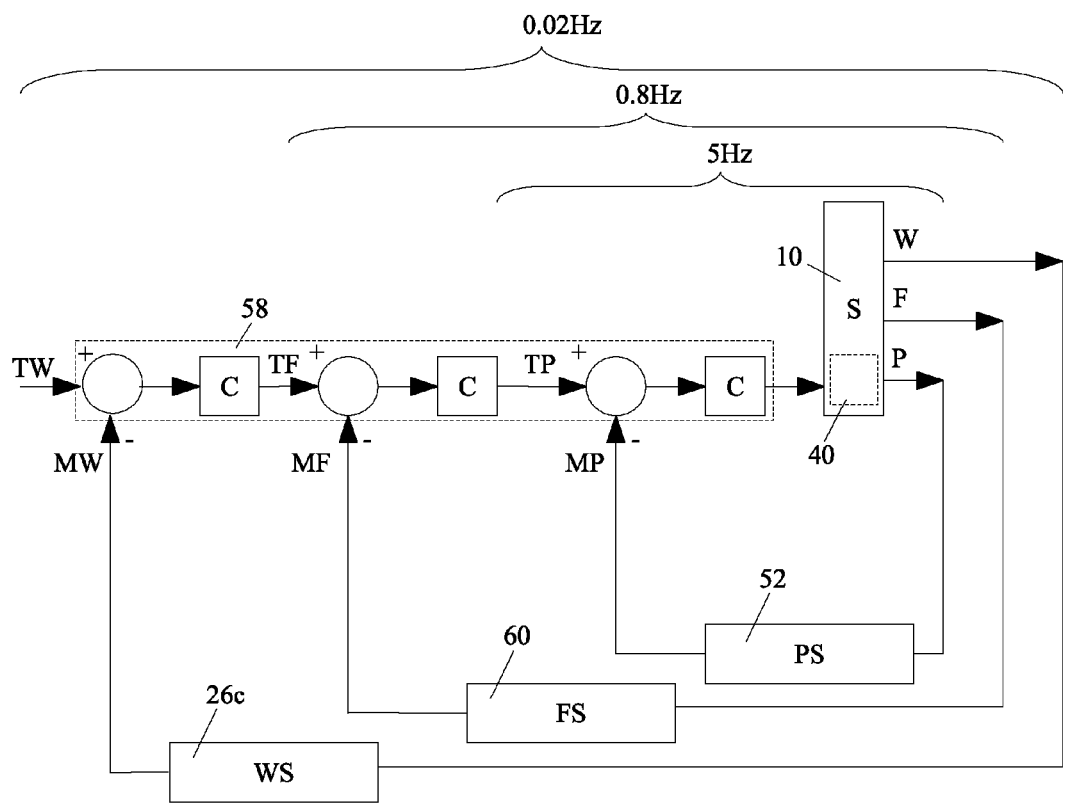
FIG. 4 is a schematic representation of a control philosophy, in accordance with the invention, that is suitable for use in the FIGS. 1 to 3 apparatus, and in accordance with the method and apparatus of the invention.

The pressure measurement represented by gauge 52 is also shown schematically in FIG. 4, which illustrates the control regime of the square baler 10 of the invention (and hence also illustrates the method of the invention) as a block diagram of a closed loop feedback multivariable control system.

In FIG. 4 a target weight TW for each bale is input as a control parameter and compared with the actual weight MW of a completed bale as represented by the output signal of a first sensor in the form of load cell 26c that is as described preferably located in the bale discharge 20. The resulting difference signal is fed forwardly via controller 58 which conditions the difference signal for comparison as a target force signal TF with an actual force signal MF generated in a second sensor 60. Sensor 60 is configured to measure the force exerted by the piston 62 in the bale-forming chamber 16 on each forward stroke of the piston 62. Not shown in the drawings are means for setting a target weight value (TW) by the operator for determining a target value for the mass of a bale formed in the baler, such means are generally known in the art and could comprise any input device such as for example a touch screen, a keyboard or a potentiometer or encoder for inputting a value to the controller 58 of the baler.

The signal resulting from this second comparison is further conditioned in controller 58 for comparison as a target pressure signal TP with the measured pressure signal MP generated by a third sensor represented schematically as pressure gauge 52. The resulting pressure difference signal is used as a control input (following further conditioning as necessary in controller 58) to the proportional solenoid valve 48 that then causes adjustment of the rams 72, 74 in accordance with operation of the hydraulic circuit 40.

As is apparent from FIG. 4, each part of the control scheme constitutes one of three "nested" control loops involving a feedback path.

The innermost loop of the control scheme, being that represented by pressure measurements, is the highest frequency part. As discussed above, preferably the frequency of sampling in this part of the control circuit is 5 Hz or higher. Other sampling frequencies however are possible within the scope of the invention.

The force measurement carried out by second sensor 60 takes place at a frequency of approximately 0.8 Hz corresponding to reciprocation of the piston of the bale-forming chamber 16. Sensing of the mass of an entire bale in the bale discharge 20 takes place for example approximately one every 50 seconds or at a frequency of 0.02 Hz. It is also possible to take a weighted mean of the weight a number of bales in which case the frequency will even be lower.

It will thus be apparent that the sampling frequency of the pressure measurements is adequately high as to take account of changes in biomass characteristics that would otherwise adversely influence bale density and hence (for fixed bale sizes) bale masses in a fashion that is adverse to eg. the farmer wishing to have the bales valued on the basis of their mass. By using the relatively low frequency output of the first sensor 26c to calibrate the target force signal TF and using the output of the second sensor 60 to calibrate the target pressure signal TP, the apparatus and method of the invention increase the precision of the weight of the resulting bale and automatically take account of biomass parameter variations as described. The circuit and apparatus of the invention therefore assure that the target weight TW is attained regardless of such characteristic changes, and using apparatus that is easy to embody in relatively simple (from the processing point of view) machines such as square balers. Overall therefore the apparatus and method of the invention offer considerable advantages compared to the prior art.

What is claimed is:

1. A square baler for creating bales of biomass having a bale-forming chamber, a piston that is reciprocable in the bale-forming chamber, the dimensions of part of the interior of the bale-forming chamber being adjustable under the influence of at least one actuator; the baler comprising:
    a first sensor for sensing the mass of a bale formed in the baler and generating a first signal that is indicative thereof;
    a second sensor for sensing the force applied by the piston and generating a second signal that is indicative thereof;
    a third sensor for sensing the energization of the actuator and generating a third signal that is indicative thereof;
    an input for setting a target weight value for determining a target value for the mass of a bale formed in the baler; and
    a controller for controlling the operation of the baler in dependence on the first, second and third signals wherein the first signal is fed back in a first control loop and compared with the target weight value in order to generate a target force value, the second signal is fed back in a second control loop and compared with the target force value in order to generate a target energization value, the third signal is fed back in a third control loop and compared with the target energization value in order to control the energization of the actuator, and a sampling frequency of the second control loop is higher than that of the first control loop and lower than that of the third control loop.

2. A square baler according to claim 1, wherein in the actuator is energizable by pressure in a hydraulic circuit, and the third sensor senses pressure in the hydraulic circuit and generates the third signal indicative thereof.

3. A square baler according to claim 1, wherein the sampling frequency of the third control loop is approximately 5 Hz or higher.

4. A square baler according to claim 1, wherein the second sensor is or comprises a load cell that detects the force exerted by the piston, the sampling frequency of the second control loop being approximately 0.8 Hz.

5. A square baler according to claim 1, wherein the first sensor is or comprises a load cell disposed to detect the mass of a bale, the sampling frequency of the first control loop being approximately 0.02 Hz or lower.

6. A square baler according to claim 5, wherein the bale discharge comprises a bale chute comprising a pivotable portion on which the mass of a completed bale is supported during discharging, the load cell being disposed to generate a signal that is indicative of the mass of a thus-supported bale acting via the pivotable portion.

7. A square baler according to claim 1, wherein the bale-forming chamber comprises at least one moveable wall portion that is moveable inwardly and/or outwardly to adjust the volume of the interior of the bale-forming chamber, the at least one moveable wall portion and at least one actuator being connected so that the at least one actuator causes movement of at least one moveable wall portion.

8. A square baler according to claim 7, wherein the baler comprises two actuators.

9. A square baler according to claim 1, wherein the at least one actuator is part of or operatively connected to a hydraulic or pneumatic piston.

10. A method for controlling a square baler comprising a biomass feed connected to a bale-forming chamber, a piston reciprocable in the bale-forming chamber and a bale discharge, the dimensions of part of the interior of the bale-forming chamber adjustable under the influence of at least one actuator; the baler comprising:
    a first sensor for sensing the mass of a bale formed in the baler and generating a first signal that is indicative thereof;
    a second sensor for sensing the force applied by the piston and generating a second signal that is indicative thereof;
    a third sensor for sensing the energization of the actuator and generating a third signal that is indicative thereof;
    an input setting a target weight value for determining a target value; and
    a controller for controlling the operation of the baler in dependence on the first, second and third signals comprises the steps of:
        feeding the first signal back in a first control loop and comparing it with the target weight value in order to generate a target weight value;
        feeding the second signal back in a second control loop and comparing it with the target force value in order to generate a target energization value;
        feeding the third signal back in a third control loop and comparing it with the target energization value in order to control the energization of the actuator; and
        a sampling frequency of the second control loop being higher than that of the first control loop and lower than that of the third control loop.

* * * * *